Figure 1:
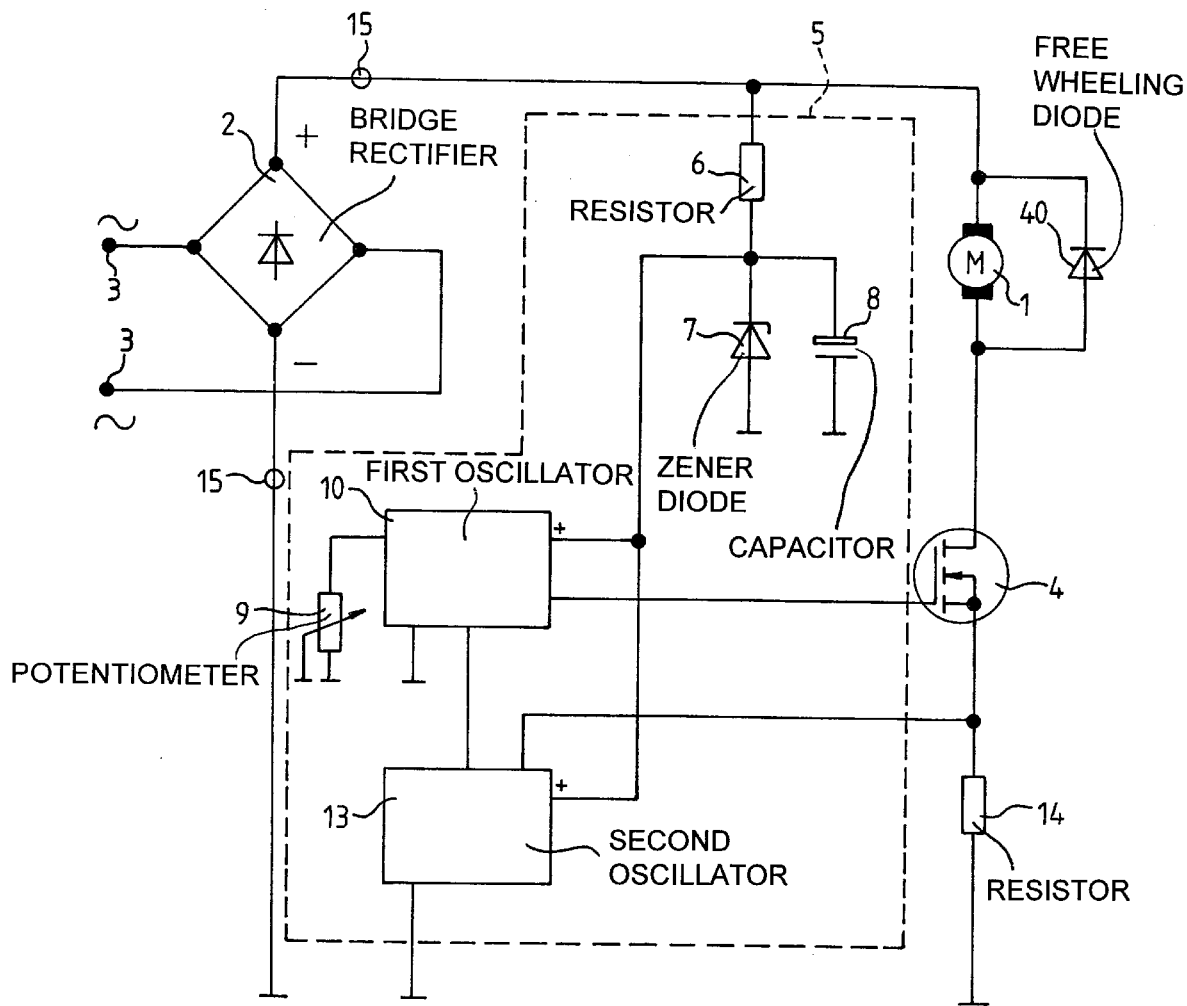

United States Patent
Bufe et al.

[11] Patent Number: 5,889,922
[45] Date of Patent: *Mar. 30, 1999

[54] DRIVE ARRANGEMENT FOR AN ELECTRIC MOTOR

[75] Inventors: Michael Bufe, Dürbheim; Gerhard Kuehnemundt, Liptingen; Alexander Knappe, Rietheim, all of Germany

[73] Assignee: Marquardt GmbH, Rietheim-Weilheim, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 588,571

[22] Filed: Jan. 18, 1996

[30] Foreign Application Priority Data

Jan. 19, 1995 [DE] Germany .................. 195 01 430.8

[51] Int. Cl.$^6$ .................................................. H02P 7/00
[52] U.S. Cl. .................. 388/804; 388/811; 388/937; 318/245; 318/432
[58] Field of Search .................................... 318/599, 244, 318/245, 432, 433, 434; 388/801, 803, 804, 809, 811, 816, 819, 903, 937

[56] References Cited

U.S. PATENT DOCUMENTS

| | | | |
|---|---|---|---|
| Re. 35,362 | 10/1996 | Arvidson et al. | 169/13 |
| 3,697,839 | 10/1972 | Unnewehr | 318/138 |
| 3,906,337 | 9/1975 | Depenbrock . | |
| 4,041,368 | 8/1977 | Gritter . | |
| 4,516,060 | 5/1985 | Guzik et al. | 318/618 |
| 4,959,598 | 9/1990 | Yoshida et al. | 318/599 |
| 5,029,229 | 7/1991 | Nelson, III | 388/811 |
| 5,289,560 | 2/1994 | Abney . | |

FOREIGN PATENT DOCUMENTS

| | | |
|---|---|---|
| 0582516 | 9/1994 | European Pat. Off. . |
| 2835382 | 2/1980 | Germany . |
| 2516951C3 | 9/1981 | Germany . |
| 3222066A1 | 12/1983 | Germany . |
| 3239968A1 | 5/1984 | Germany . |
| 3524563A1 | 1/1987 | Germany . |
| 3500714C2 | 12/1988 | Germany . |
| 3819166A1 | 12/1989 | Germany . |
| 41 30 532 | 3/1993 | Germany . |
| 3732813C2 | 6/1993 | Germany . |
| 4210273A1 | 9/1993 | Germany . |
| 4210273C2 | 4/1994 | Germany . |

*Primary Examiner*—Bentsu Ro
*Attorney, Agent, or Firm*—Venable; Gabor J. Kelemen

[57] ABSTRACT

The invention relates to a method for driving an electric motor (1) which is employed, in particular, in manually guided electric tools, such as drilling machines, screwing machines or the like. Variable pulses of an electric voltage are applied to the electric motor (1) in such a way that the rotor of the electric motor (1) moves at a rotational speed which can be set. In order that the rotor of the electric motor (1) moves intermittently or abruptly, at least parts of at least individual pulses are blanked by superposition of a pulse interval having a zero voltage. A circuit arrangement for a method of this type has control electronics (5) and an electronic power switch (4), such as a triac, a transistor, an IGBT or the like, which is switched by the control electronics (5) in such a way that the variable pulses can be applied to the electric motor (1) via the electronic power switch (4). The control electronics (5) further contain means for switching the electronic power switch (4) off during at least parts of at least individual pulses.

21 Claims, 4 Drawing Sheets

DRIVE ARRANGEMENT FOR AN ELECTRIC MOTOR

The invention relates to a method for driving an electric motor and to a circuit arrangement which realizes this method.

In many applications, it is necessary to drive electric motors in such a way that the rotor of the electric motor moves at a rotational speed which can be set. Such drive circuits are used particularly in hand-held electric tools, such as drilling machines, screwing machines or the like.

DE-A 35 24 563 has disclosed a circuit arrangement for driving an AC-fed electric motor, which circuit arrangement comprises control electronics and a triac which serves as an electronic power switch. The triac is switched by the control electronics in such a way that variable pulses of an electric mains voltage, namely gated sinusoidal oscillations, can be applied to the electric motor via said triac. The electric motor is thereby operated continuously at the set rotational speed.

There are applications where the electric motor is to be operated at relatively high rotational speeds, on the one hand, but where pinpoint disconnection of the electric motor is desired, on the other hand. For example, it is desirable in the case of an electric screwdriver to screw the screw in at the highest rotational speed possible. However, pinpoint disconnection of the electric motor is necessary, in order to ensure flush screwing in of the head of the screw. What is problematic with the known circuit arrangement is the disconnection in good time of the electric motor, particularly in difficult applications, for example when the screw has to be screwed into hard materials.

The invention is based on the object of specifying a method for operating an electric motor which enables pinpoint disconnection of the electric motor. Furthermore, the known circuit arrangement is intended to be developed further, so that it is suitable for realizing this method.

This object and others to become apparent as the specification progresses, are accomplished by the invention, according to which, briefly stated, variable voltage pulses at a first frequency are applied to the electric motor for rotating the rotor with a settable rpm; and superposing pulse intervals of zero voltage at a second frequency on the pulses of the first frequency for blanking out at least parts of at least individual pulses to rotate the rotor intermittently. The second frequency is lower than the first frequency.

The method according to the invention and the associated circuit arrangement realize a pulsed mode of the electric motor in which the rotor of the latter is moved intermittently or abruptly at the set rotational speed. The method is suitable for driving any desired electric motors, such as universal motors, permanent-magnet motors or the like.

Pulse width modulation can be used to drive a DC-fed electric motor and phase gating control can be used to drive an AC-fed electric motor. The pulses used in the case of pulse width modulation are square-wave pulses of variable width and the pulses used in the case of phase gating control are gated sinusoidal oscillations, said square-wave pulses of variable width and said gated sinusoidal oscillations each being fed to the electric motor at a first frequency f1. In a development of the invention, in the pulsed mode, it is possible to superpose on these pulses pulse intervals having a second frequency f2 which is less than the first frequency f1. Depending on the application, the second frequency f2 may be adjustable or fixedly predetermined. The frequency f2 may advantageously be selected such that preferably whole multiples of the pulses are blanked, the blanking being effected, in particular, in synchronism with the first frequency f1 using suitable means. The first frequency f1 and the second frequency f2 are generated by suitably designed oscillators.

The pulsed mode of the electric motor may be effected in the entire operating range of the latter or alternatively only in specific parts of the operating range. It is particularly advantageous here if the pulsed mode starts automatically once certain preset limit values have been exceeded, for example once a specific torque has been exceeded. For example, in the case of an electric screwdriver, the motor current can be acquired via a current measuring device. If said motor current exceeds a suitably set limit value, then the presence of a relatively difficult screwing operation is signalled. This in turn effects starting of the pulsed mode. In the case of easier screwing operations, that is to say those in which the motor current consumption does not exceed the limit value, the starting of the pulsed mode can be completely omitted. The situation where the user is subjected to unnecessary machine vibration is consequently avoided, which machine vibration, incidentally, can be kept small to a large extent by adapted selection of the second frequency f2.

If the circuit arrangement according to the invention is employed in hand-held electric tools, then it may be advantageous to arrange the circuit arrangement directly in an electric switch for setting the rotational speed for the hand-held electric tool. Of course, it is also possible to arrange the circuit arrangement at an expedient location in the housing of the hand-held electric tool and establish a connection from there to the electric switch.

The advantages which are achieved in particular by means of the invention are that sensitive operation of the electric motor is made possible even at high rotational speeds, since the electric motor can be disconnected with pinpoint accuracy by the user. If, for example, an electric screwdriver is operated by the method according to the invention, then the screw can be screwed into the receiving material in normal operation. If the screw head reaches the surface of the material, then there is a changeover to the pulsed mode, with the result that the screw is intermittently screwed in further. When the screw head is flush in the surface of the material, the user can then effortless disconnect the electric screwdriver between two intermittent movements. The use of the method according to the invention consequently has the effect of reducing the rejects when processing workpieces with the aid of electric tools.

If the corresponding electric tool is used for screwing, then the method permits the screws to be screwed in smoothly and flush. On the other hand, the release of screws that are jammed is also facilitated, since the pulsed mode in each case results in a momentary increase in torque. This increase in torque overcomes the high coefficient of static friction in the case of screws that are jammed. Once the screw has been released, it is possible to switch back directly to the conventional mode, since the coefficient of sliding friction is considerably lower than the coefficient of static friction.

Figure 2:
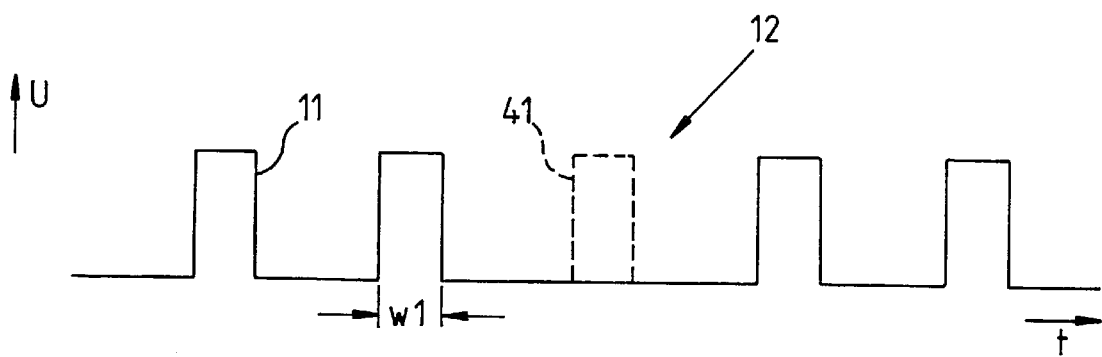
Figure 3:
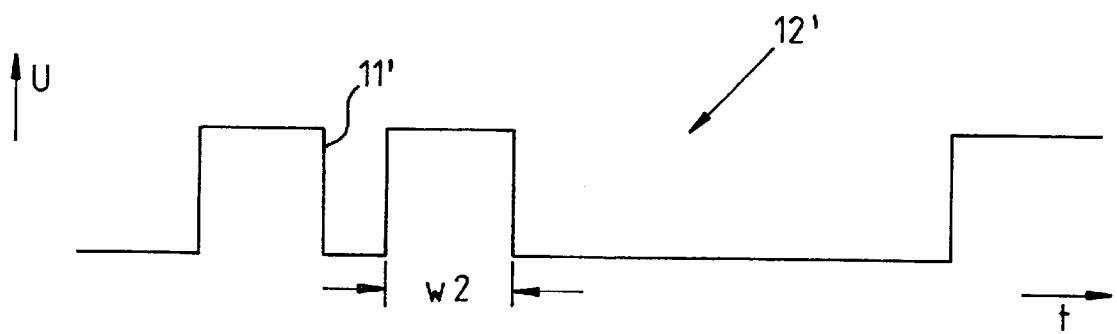
Figure 5:
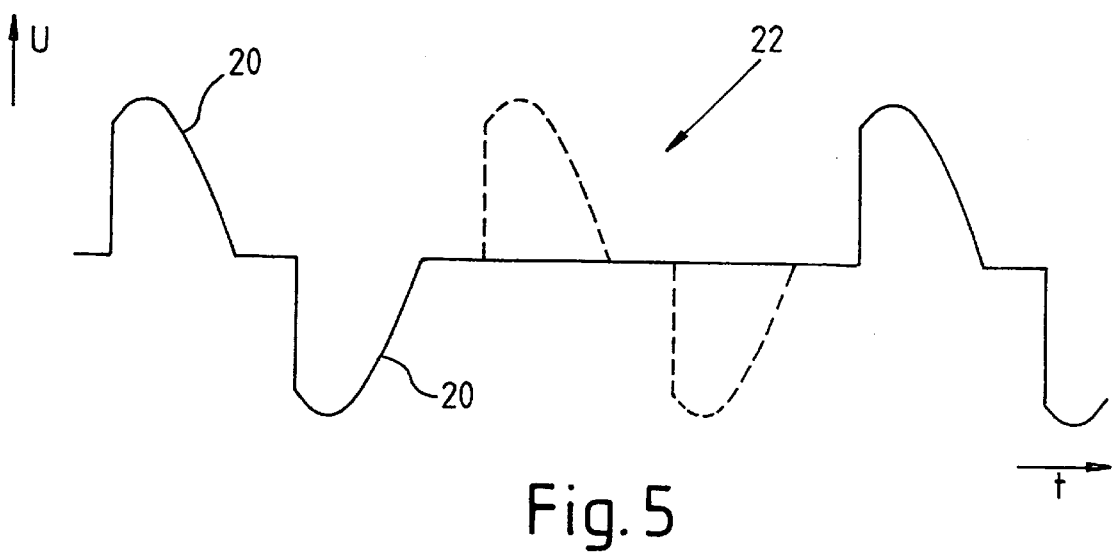
Figure 4:
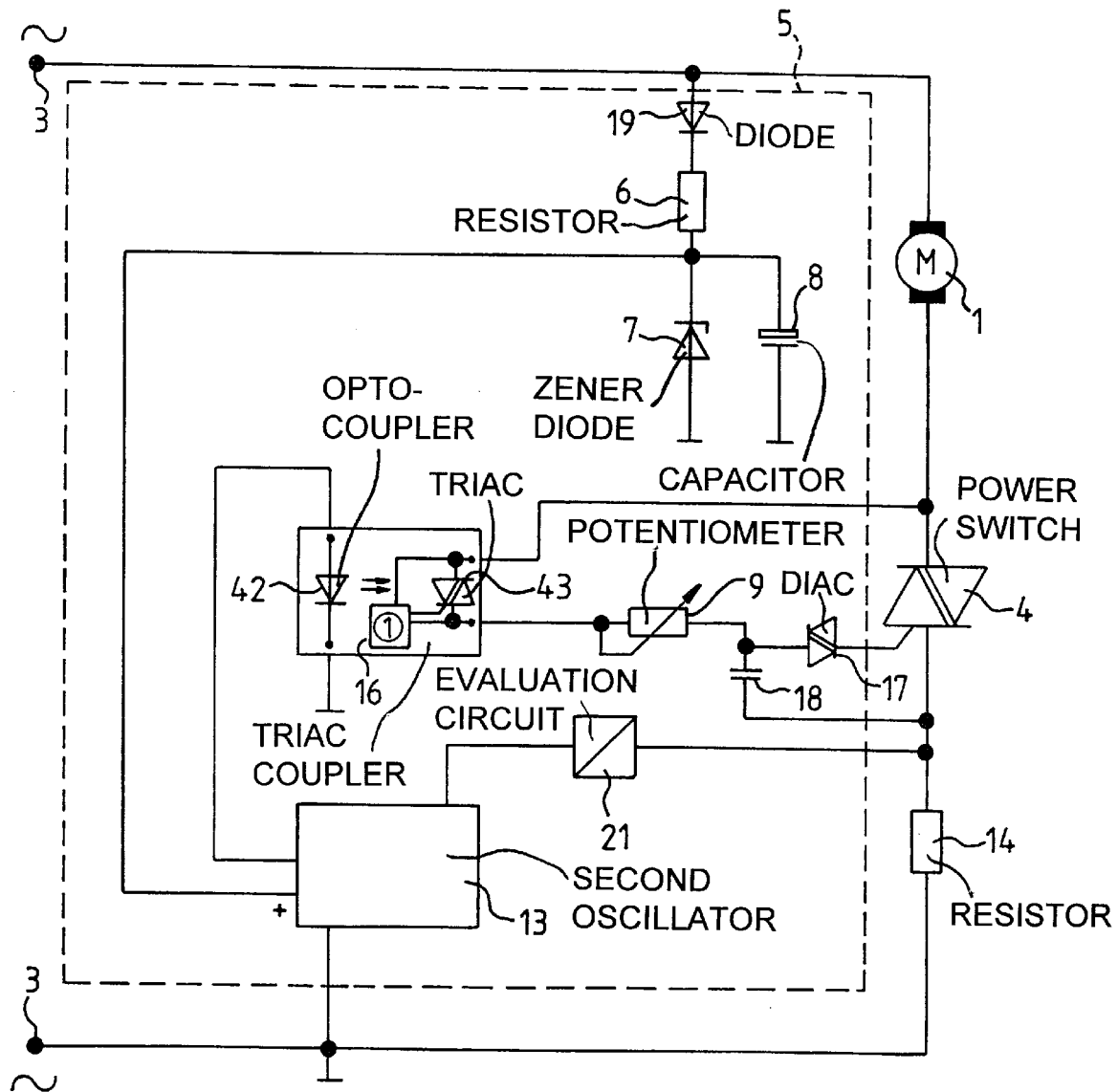
Figure 6:
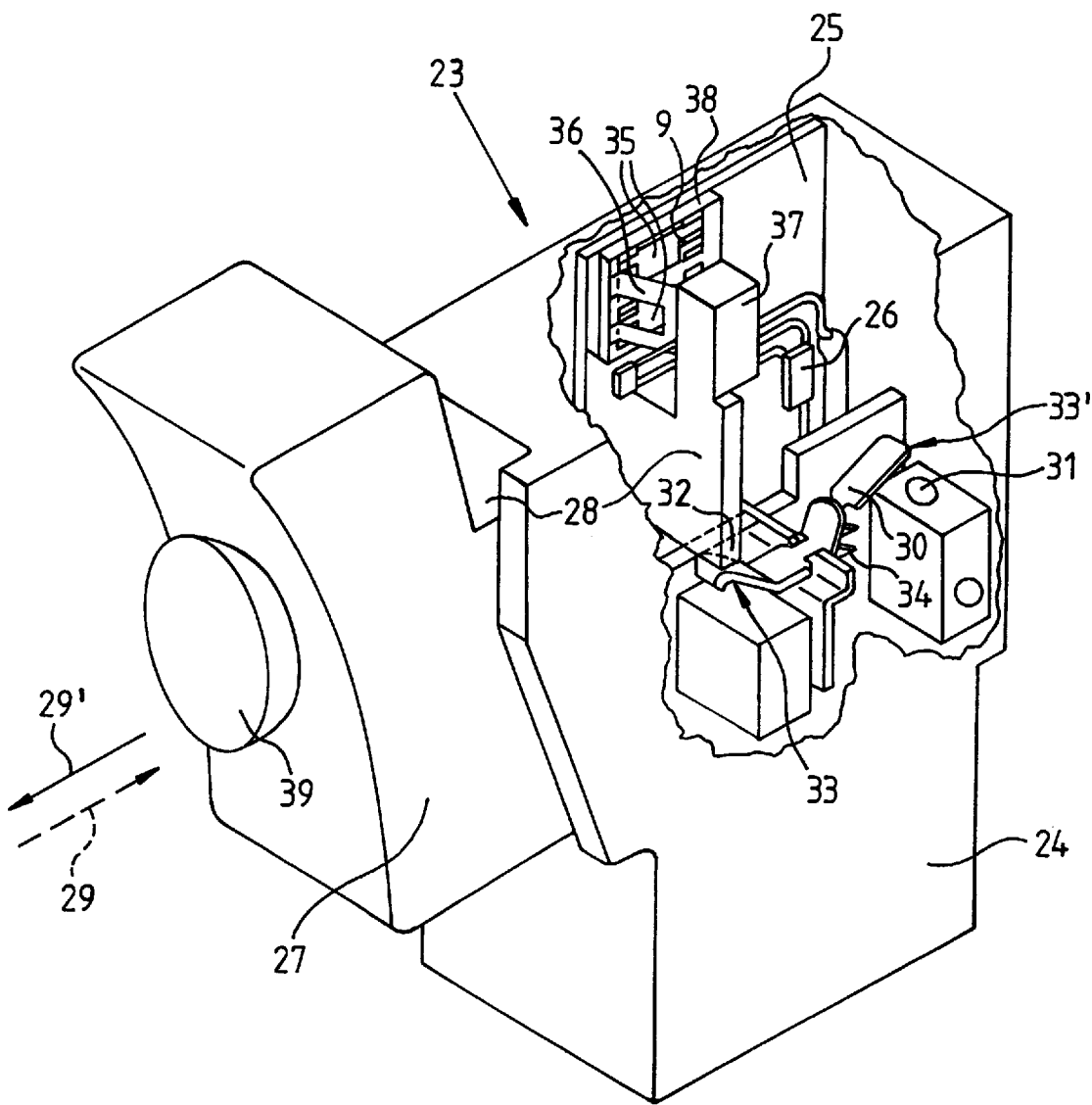

Exemplary embodiments of the invention are described in more detail below and are illustrated in the drawings, in which FIG. 1 shows a circuit arrangement for driving a DC-fed electric motor, FIG. 2 shows a voltage(U)/time(t) diagram of the pulses for driving the electric motor according to FIG. 1 at a first rotational speed, FIG. 3 shows a diagram as in FIG. 2, but for driving the electric motor at a second rotational speed, FIG. 4 shows a circuit arrangement for driving an AC-fed electric motor, FIG. 5 shows a voltage(U)/time(t) diagram of the pulses for driving the electric motor of FIG. 4, and FIG. 6 shows a diagrammatic illustration of an electric switch for setting the rotational speed of electric motors in hand-held electric tools, in a perspective and partially cut-away view.

A first embodiment of a circuit arrangement for driving an electric motor 1 at a rotational speed which can be set can be seen in FIG. 1. The electric motor 1 is a universal motor such as is used, in particular, in manually guided electric tools, for example drilling machines, screwing machines or the like.

The electric motor 1 is fed using direct current, for which purpose the electric motor 1 provided with a free wheeling diode 40 is connected via a bridge rectifier 2 to the terminals 3 for the mains voltage. In order to operate the electric motor 1 at a specific rotational speed, there is arranged in the motor circuit an electronic power switch 4, which is in turn driven by control electronics 5. The electronic power switch is a field-effect transistor, namely an MOSFET. Of course, a bipolar transistor, an IGBT or the like can also be used for this. The control electronics 5 are supplied with the necessary operating voltage from the bridge rectifier 2, for which purpose a resistor 6, a zener diode 7 and a capacitor 8 are arranged in the control electronics 5.

For setting the rotational speed, the control electronics 5 operate with pulse width modulation, a first oscillator 10 driving the electronic power switch 4 at a first frequency f1, with the result that pulses 11, which are shown in FIG. 2 and are in the form of square-wave pulses at the first frequency f1, are applied to the electric motor 1. The user manually sets the desired rotational speed of the electric motor 1 at a potentiometer 9 in the control electronics 5. In accordance with this presetting at the potentiometer 9, the electronic power switch 4 is switched by the first oscillator 10 in the control electronics 5 in such a way that variable-width pulses 11 of the electric voltage U emitted by the bridge rectifier 2 can be applied to the electric motor 1 via the electronic power switch 4.

As is shown in FIG. 2, the pulses 11 have a width w1, by which means the electric motor 1 is operated at a certain rotational speed n1. If it is now intended to increase the rotational speed of the electric motor 1, then the width of the pulses 11 is increased according to the setting of the potentiometer 9. FIG. 3 shows, for example, pulses 11' which have a larger width w2, as a result of which the electric motor 1 adopts the higher rotational speed n2. Conversely, the width of the pulses 11 is decreased in order to reduce the rotational speed of the electric motor 1. However, the frequency f1 at which the first oscillator 10 drives the electronic power switch 4 remains constant, as is evident from FIGS. 2 and 3.

If the electric motor 1 is driven in this way by pulses 11, 11', then the rotor of the electric motor 1 moves continuously at the associated rotational speed n1, n2. In order to produce the desired pulsed mode of the electric motor 1, at least parts of at least individual pulses 11, 11' are blanked in accordance with the method according to the invention. To this end, a pulse interval 12, 12' is superposed on these parts. The pulse interval 12, 12' has a voltage U having a magnitude of zero, in other words a so-called zero voltage. The rotor of the electric motor 1 thereby moves intermittently or abruptly at the set rotational speed n1, n2.

For the purpose of simplification, it is preferred here to blank whole multiples of the pulses 11, 11'. In FIG. 2, for example, a whole pulse 11 is blanked in each case, to be precise the third pulse 11 in FIG. 2. For clarity, the blanked pulse 11 is drawn with dashed lines in FIG. 2. During the pulse interval 12, the supply voltage U which is otherwise present is not applied to the electric motor 1, rather the latter is de-energized. In FIG. 3, two pulses 11' are each blanked by a pulse interval 12'. The type of impacts in the pulsed mode can be set by the magnitude of the pulse interval 12, 12'.

Whereas the pulses 11, 11' for the electric motor 1 have a first frequency f1, the pulse intervals 12, 12' are superposed at a second frequency f2 on the pulses 11, 11'. In this case, the second frequency f2 is less than the first frequency f1. In order to generate the pulse intervals 12, 12' at the frequency f2, the control electronics 5 have means for switching off the electronic power switch 4. As can be seen more clearly in FIG. 1, these means comprise a second oscillator 13 for generating a signal at the second frequency f2. The second oscillator 13 acts on the control electronics 5, to be precise the signal of the second oscillator 13 is transmitted to the first oscillator 10 situated in the control electronics 5. As a result, the first oscillator 10 is cyclically blocked at the frequency f2, by which means, in turn, the electronic power switch 4 is switched off, thereby producing, finally, a pulse interval 12, 12' at the electronic power switch 4.

The superposition of the pulse intervals 12, 12' preferably takes place in synchronism with the pulses 11, 11' at the first frequency f1, for example in synchronism with the rising edge 41 of the pulse 11, as is shown in FIG. 2. This can be particularly advantageous when the ratio of the two frequencies f1, f2 is not an integer or is only an approximate integer. Corresponding means for synchronizing the second oscillator 13 with the first oscillator 10 are arranged in the control electronics 5. Electronic means of this type, which detect the appearance of the edge 41, for example, are known per se and do not need to be explained in any more detail here. Synchronization can be particularly expedient when, as already mentioned, whole multiples of the pulses 11, 11' having the first frequency f1 are to be blanked cyclically at the second frequency f2.

The frequency f2 of the second oscillator 13 can be fixedly predetermined, matched to the respective purpose of the circuit arrangement. However, it is also possible to make provision for it to be adjustable by the user, so that the user can vary the frequency f2 within certain limits according to his requirements. It is possible to use, for example, a potentiometer (not shown in FIG. 1) to adjust the frequency f2.

There may be provision for the pulses 11, 11' to be blanked in the entire operating range of the electric motor 1. As an alternative, the pulses 11, 11' may also be blanked only in specific parts of the operating range of the electric motor 1. For this purpose, it can be provided that the means for switching off the electronic power switch 4 can be connected manually by the user. For example, an electric switch can be arranged on the second oscillator 13, with the result that the user can connect or disconnect the latter.

In a further embodiment, the means for switching off the electronic power switch 4 are designed such that they can be connected automatically. For example, the pulsed mode of the electric motor 1 may be required only when a certain torque is exceeded, which torque is output at the rotor and in proportional to the motor current. Arranged for this case is a current measuring device for the motor current, which device contains a resistor 14, a so-called shunt resistor, which is situated in the motor circuit, as can be seen in FIG. 1. The motor current flowing through the resistor 14 generates a voltage drop across the resistor 14, which voltage drop is proportional to the motor current. This voltage drop is fed to the control electronics, to be precise to an evaluation circuit in the second oscillator 13. If this motor current which is determined by the current measuring device exceeds a preset limit value, then the means for switching off the electronic power switch 4, namely the second oscillator 13, are activated, causing the intermittent or abrupt operation of the electric motor 1 to start.

The circuit arrangement shown in FIG. 1 is also suitable for a battery powered electric tool. Of course, the bridge rectifier 2 and the terminals 3 for the mains voltage are then omitted. The battery can be connected directly to the terminals 15 of the circuit arrangement. If appropriate, the resistor 6, the zener diode 7 and the capacitor 8 can also be omitted.

Shown as a further embodiment in FIG. 4 is a circuit arrangement which operates with phase gating control to vary the rotational speed and is used to drive an AC-fed electric motor 1. The electric motor 1 is connected to the mains voltage via the terminals 3. An electronic power switch 4 which comprises a triac is once again arranged in the motor circuit. The control electronics 5 for driving the electronic power switch 4 contain a potentiometer 9 for setting the desired value for the rotational speed. The control electronics 5 are supplied with the operating voltage via a diode 19, a resistor 6, a capacitor 8 and a zener diode 7. Together with a capacitor 18 and a diac 17, the potentiometer 9 forms a trigger circuit which emits a trigger signal to the electronic power switch 4, which is designed as a triac, at the trigger angle corresponding to the setting of the potentiometer 9. The electric motor 1 thereby receives pulses 20 (shown in FIG. 5) in the form of gated sinusoidal oscillations. These pulses 20 have a first frequency f1 which is the frequency of the mains voltage, whereby in this respect a first oscillator is not required in this circuit arrangement. The pulses 20 cause the rotor of the electric motor 1 to move at the set rotational speed.

As can be seen further in FIG. 4, a resistor 14 which serves to measure the motor current is once more arranged in the motor circuit. The voltage drop across the resistor 14 is fed to an evaluation circuit 21, which again activates a second oscillator 13 when a preset limit value is exceeded. If the second oscillator 13 is switched on, then it emits a signal at a second frequency f2, which signal is fed to the trigger circuit for the electronic power switch 4, whereby the trigger circuit is blocked at a frequency f2. As a result, the electronic power switch 4 is once again switched off during parts of individual pulses 20. Pulse intervals 22 are consequently produced by the blanking of parts of pulses 20, as is illustrated in FIG. 5 by the pulse which is drawn using dashed lines. No voltage is applied to the electric motor 1 in the pulse intervals 22, with the result that the rotor of the electric motor 1 moves intermittently or abruptly at the set rotational speed.

In the case of this circuit arrangement, too, it is preferred to blank whole multiples of the gated sinusoidal oscillations by means of pulse intervals 22 having the second frequency f2. In FIG. 5, for example, a single gated sinusoidal oscillation is blanked in each case. In order to synchronize the pulse intervals 22 having the second frequency f2 with the pulses 20 having the first frequency f1, namely the mains frequency, a triac coupler 16 with zero switching is arranged in the control electronics 5, as can be seen more closely in FIG. 4.

The triac coupler 16 is a module which contains an optocoupler 42 as well as a triac 43. If the second oscillator 13 is not activated, then the optocoupler 42 is actuated and the triac 43 is switched on as a result. The trigger circuit for the electronic power switch 4 is active as a result of this, whereby the electric motor 1 operates in the normal mode. If the oscillator 13 is activated, then the optocoupler 42 is switched off at the second frequency f2. The triac 43 is in the on state until the next zero crossing of the mains voltage and is then switched off. From this point in time, the trigger circuit for the electronic power switch 4 is thus inactive, whereby a pulse interval 22 exists. As long as the optocoupler 42 is switched off, the triac 43 cannot trigger and the trigger circuit for the electronic power switch 4 consequently remains inactive. If the optocoupler 42 is subsequently switched on again by the second oscillator 13, then the triac 43 can trigger again and the electronic power switch 4 can consequently be activated again. As is evident, the triac coupler 16 consequently synchronizes the signal of the oscillator 13 at the frequency f2 with the zero crossing of the mains voltage and thus with the frequency f1.

As they are shown in the exemplary embodiments according to FIGS. 1 and 4, the circuit arrangements can expediently be arranged in the switch for an electric tool. Such an electric switch 23, which is used for setting the rotational speed for the electric tool, is diagrammatically illustrated in FIG. 6. The switch 23 has a switch housing 24 in which a printed circuit board 25 is arranged. Situated on the printed circuit board 25 are the electrical and electronic components 26 such as have already been described in the above circuit arrangements.

In the case of the switch 23, the actuating element 27, which is designed as a pushbutton, is mounted displaceably on the switch housing 24 and has an actuating plunger 28 which is fixed thereto and leads into the interior of the switch 23. The actuating element 27 can be moved manually in the direction of the arrow 29 against a pressure spring (not illustrated), so that, once released, it returns back to the starting position in accordance with the arrow 29'.

Situated in the switch 23 is a mains switch for switching the supply voltage for the hand-held electric tool on and off. This mains switch comprises a contact rocker 30 and a connection contact 31. In the unactuated state of the actuating element 27, a switching cam 32 situated on the actuating plunger 28 acts on the one end 33 of the contact rocker 30, so that the contact connection between the other end 33' of the contact rocker 30 and the connection contact 31 is open. When the actuating element 27 is actuated, the switching cam 32 releases the end 33 of the contact rocker 30 and a tension spring 34 draws the other end 33' of the contact rocker 30 to the connection contact 31, with the result that the electrical connection on the mains switch is now closed.

The potentiometer 9 for setting the rotational speed of the electric motor 1 is composed of two resistive tracks 35, which are fitted on a substrate 38, and a slider 36. The slider 36, which is fixed to an attachment 37 situated on the actuating plunger 28 in the interior of the switch 23, slides with one end on the two resistive tracks 35 arranged on the printed circuit board 25. The movement of the actuating element 27 causes the slider 36 to move on the resistive tracks 35 and, as a result, the resistance of the potentiometer 9 is changed in accordance with the adjustment displacement of the actuating element 27.

Situated on the actuating element 27 of the switch 23 is a setting knob 39, with which the user can preset a limit value for the torque exerted by the rotor of the electric motor 1. Of course, this setting knob 39 may also be situated at another expedient location on the housing of the hand-held electric tool. The torque generated by the electric motor 1 is determined by the current measuring device and if said torque exceeds said limit value, then the circuit arrangement, situated on the printed circuit board 25, for driving the electric motor 1 changes to the mode of operation in which pulse intervals are superposed on parts of individual pulses or on individual pulses. In this mode of operation, which has already been described with reference to the diagrams in FIGS. 2, 3 and 5, the rotor of the electric motor 1 moves intermittently or abruptly, thereby resulting in a pulsed mode of the working tool on the hand-held electric tool.

The invention is not restricted to the exemplary embodiments which have been described and illustrated. Rather it also encompasses all expert developments in the context of the concept of the invention. Thus, the method according to the invention and the associated circuit arrangement can be employed not just in hand-held electric tools. The invention can also be used, for example, in domestic appliances, such as kitchen machines, mixers or the like, which are used, inter alia, for the comminution of foodstuffs.

We claim:

1. A method of driving the rotor of an electric motor, comprising the following steps:
   (a) applying to the electric motor variable voltage pulses at a first frequency for rotating the rotor in a continuous run with a settable rpm;
   (b) sensing one of a voltage applied to the electric motor and a current flowing through the electric motor during performance of step (a); and
   (c) upon sensing a predetermined magnitude of one of said voltage and said current during performance of step (b), automatically superposing on the pulses of said first frequency pulse intervals of zero voltage at a second frequency for blanking out at least parts of at least individual pulses to rotate the rotor in an intermittent run; said second frequency being lower than said first frequency.

2. The method as defined in claim 1, wherein said second frequency is adjustable for varying a length of said pulse intervals to affect the intermittence of rotation of said rotor.

3. The method as defined in claim 1, further comprising the step of predetermining said second frequency at a fixed value.

4. The method as defined in claim 1, wherein step (b) comprises the step of blanking out whole multiples of pulses of said first frequency.

5. The method as defined in claim 1, wherein step (b) is performed in selected parts of the operating range of the electric motor.

6. The method as defined in claim 1, wherein step (b) is performed in the entire operating range of the electric motor.

7. The method as defined in claim 1, wherein step (b) is initiated automatically by a drive arrangement.

8. The method as defined in claim 1, wherein said electric motor is a d.c. motor; further wherein said voltage pulses of said first frequency are square wave pulses; further comprising the step of modulating a width of said square-wave pulses for varying the rotational speed of said rotor.

9. The method as defined in claim 8, wherein step (b) comprises the step of blanking out parts of said square-wave pulses at said second frequency in synchronism with said first frequency.

10. The method as defined in claim 8, wherein step (b) comprises the step of blanking out whole multiples of said square-wave pulses at said second frequency.

11. The method as defined in claim 1, wherein said electric motor is an a.c. motor; further wherein said voltage pulses of said first frequency are gated sinusoidal oscillations; and further comprising the step of varying the rotational speed of said rotor by a phase gating control.

12. The method as defined in claim 11, wherein step (b) comprises the step of blanking out parts of said gated sinusoidal oscillations at said second frequency in synchronism with said first frequency.

13. The method as defined in claim 11, wherein step (b) comprises the step of blanking out whole multiples of said gated sinusoidal oscillations at said second frequency.

14. A circuit arrangement for driving an electric motor, comprising
   (a) an electronic power switch for applying variable pulses to the electric motor to operate the electric motor at a preset rotational speed; and
   (b) control electronics having an output connected to said electronic power switch and including
      (1) a first oscillator for generating first pulses of a first frequency; said first oscillator being connected to said output for switching said electronic power switch with said first pulses; and
      (2) means for switching off said power switch, including a second oscillator for generating second pulses of a second frequency, lower than said first frequency, for cyclically blocking said output of said control electronics with said second pulses for switching the electronic power switch off during at least parts of at least individual said first pulses to drive the electric motor intermittently at said preset rotational speed.

15. The circuit arrangement as defined in claim 14, further comprising
   (c) a current measuring device for measuring a motor current; said current measuring device including a resistor forming part of a motor circuit carrying the motor current;
   (d) means for applying the motor current, determined by said current measuring device, to an input of said control electronics for activating said means for switching off said power switch when a preset limit value of said motor current is exceeded.

16. The circuit arrangement as defined in claim 14, further comprising means for synchronizing said first oscillator with said second oscillator for cyclically switching off said power switch at said second frequency.

17. The circuit arrangement as defined in claim 16, wherein the electric motor is a d.c. motor; said control electronics further comprising means for generating said first pulses as square wave pulses; further wherein said means for switching off said power switch includes means for modulating a width of said square-wave pulses with said second pulses for varying the rotational speed of the motor.

18. The circuit arrangement as defined in claim 16, wherein said electric motor is an a.c. motor; said control electronics further comprising means for generating said first pulses as gated sinusoidal oscillations; further wherein said synchronizing means includes a triac coupler with zero switching.

19. The circuit arrangement as defined in claim 14, further comprising means for synchronizing said first oscillator with said second oscillator for cyclically switching off said power switch at said second frequency during whole multiples of said first pulses.

20. The circuit arrangement as defined in claim 14, in combination with an electric switch for setting a rotational speed of a hand-held electric tool; said circuit arrangement being accommodated in said electric switch.

21. The circuit arrangement as defined in claim 14, in combination with an electric switch for setting a rotational speed of a hand-held electric tool; said circuit arrangement being connected to said electric switch.

* * * * *